Patented Sept. 15, 1942

2,295,564

UNITED STATES PATENT OFFICE 2,295,564

DIAZINE DERIVATIVES

Gaetano F. D'Alelio and James W. Underwood, Pittsfield, Mass., assignors to General Electric Company, a corporation of New York No Drawing. Application August 30, 1941, Serial No. 409,025

14 Claims. (Cl. 260—251)

This invention relates to new chemical compounds and more particularly to diazine derivatives. The invention especially is concerned with the production of new and useful semicarbazido and thiosemicarbazido diazines.

The diazine derivatives of this invention may be represented graphically by the following general formula:

I

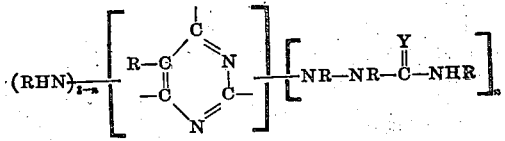

In the above formula $n$ represents an integer and is at least 1 and not more than 3, Y represents a member of the class consisting of oxygen and sulfur, and R represents a member of the class consisting of hydrogen and monovalent hydrocarbon and halo-hydrocarbon radicals, numerous examples of which hereafter are given. From a consideration of the formula it will be seen that when $n$ is 3 there will be no amino (—NHR) groups attached to the diazine nucleus.

Illustrative examples of monovalent radicals that R in the above formula may represent are aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlorphenyl, chlorcyclohexyl, chlorethyl, dichlorphenyl, ethyl chlorphenyl, phenyl chlorethyl, brompropyl, bromtolyl, etc. Preferably R is hydrogen.

The new diazine derivatives of this invention may be used as intermediates in the preparation of derivatives thereof such as carbazic esters (hydrazino carboxylic esters), salts of carbazic acid (hydrazino carboxylic acid), etc., of the individual semicarbazido or thiosemicarbazido diazine. The chemical compounds of this invention are especially valuable in the preparation of synthetic resinous compositions. The hydrazino diazines are so strongly basic that it is difficult to cure the resinous aldehyde-reaction products thereof to the insoluble and infusible state. However, by converting the hydrazino diazines to the semicarbazido and thiosemicarbazido derivatives of this invention, the basicity disappears. Resinous aldehyde-reaction products therefore can be made that readily cure to the insoluble, infusible state. Thus, the compounds of this invention may be condensed with, for instance, aldehydes, including polymeric aldehydes and aldehyde-addition products, to yield condensation products of particular utility in the plastics and coating arts. Such condensation products are more fully described and are specifically claimed in our copending application Serial No. 409,024, filed concurrently herewith and assigned to the same assignee as the present invention.

Various methods may be employed to produce the chemical compounds of this invention. One suitable method comprises effecting reaction between a halogenated 1,3-diazine (that is, a diazine having a halogen atom attached directly to a carbon atom of the diazine nucleus) and a semicarbazide or a thiosemicarbazide corresponding to the semicarbazido or thiosemicarbazido substituent to be introduced into the diazine nucleus. This reaction may be represented by the following general equation:

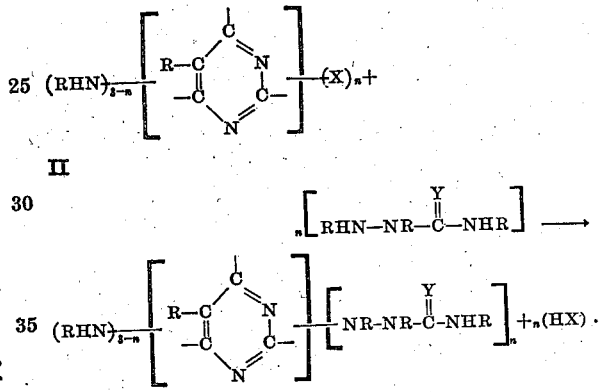

In the above equation X represents halogen, and $n$, R and Y have the same meanings as given above with reference to the general Formula I for the diazine derivatives of this invention. This reaction is best carried out in an anhydrous liquid medium, for example in ether, benzene, alcohol, etc.

It will be understood, of course, by those skilled in the art that the choice of the starting reactants and the mol ratios thereof depend upon the particular end-products desired. Illustrative examples of halogenated 1,3-diazines that may be used, depending upon the particular product sought, are listed below:

4-chloro 2,6-diamino 1,3-diazine
2-chloro 4,6-diamino 1,3-diazine
2-bromo 4,6-diamino 1,3-diazine
2,4-dichloro 6-amino 1,3-diazine
2,4-dibromo 6-amino 1,3-diazine
2,4,6-trichloro 1,3-diazine
2,4,6-tribromo 1,3-diazine
2-chloro 4,6-di-(ethylamino) 1,3-diazine 2,4-dichloro 5-phenyl 6-cyclohexylamino 1,3-diazine
2-chloro 4-ethylamino 6-amino 1,3-diazine
2-chloro 4-ethylamino 5-ethyl 6-phenylamino 1,3-diazine
2-chloro 4,6-di-(chlorphenylamino) 1,3-diazine
4-bromo 2,6-di-(chlorpropylamino) 1,3-diazine
2-chloro 4-amino 6-naphthylamino 1,3-diazine
2-chloro 5-ethyl 4,6-diamino 1,3-diazine
2,4-dichloro 5-phenyl 6-amino 1,3-diazine
2,4,6-trichloro 5-methyl 1,3-diazine
2-bromo 5-cyclohexyl 4,6-diamino 1,3-diazine
2-chloro 5-chlorphenyl 4,6-diamino 1,3-diazine Illustrative examples of the carbazides and thiocarbazides that may be employed, depending upon the particular semicarbazido or thiosemicarbazido substituent to be introduced into the diazine nucleus, are shown below. The numbering system used is the same as that found in "Richter's Organic Chemistry," 2nd edition, vol. I, translated by Spielman, Blakiston's Son and Co., Philadelphia, Pa., namely,

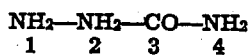

Semicarbazide
Thiosemicarbazide
4-methyl semicarbazide
2-methyl semicarbazide
2-methyl 4-ethyl semicarbazide
1,2-dimethyl semicarbazide
4-methyl thiosemicarbazide
2-methyl 4-allyl thiosemicarbazide
1,4-diphenyl semicarbazide
2,4-diphenyl thiosemicarbazide
1,3,5-triethyl semicarbazide
1-phenyl 4-ethyl semicarbazide
1-ethyl 4-(beta-chlorallyl) thiosemicarbazide
1-chlorphenyl 4-tolyl semicarbazide In order that those skilled in the art better may understand how the present invention may be carried into effect, the following illustrative examples thereof are given:

Example 1

*Preparation of 2-semicarbazido 4,6-diamino 1,3-diazine*

One mol of 2-chloro 4,6-diamino 1,3-diazine and two mols of semicarbazide in ether, alcohol or other suitable anhydrous liquid medium are stirred together for from 15 to 24 hours at or below room temperature. The reaction product (2-semicarbazido 4,6-diamino 1,3-diazine) is filtered off, washed free of semicarbazide hydrochloride and dried. The following equation represents the reaction:

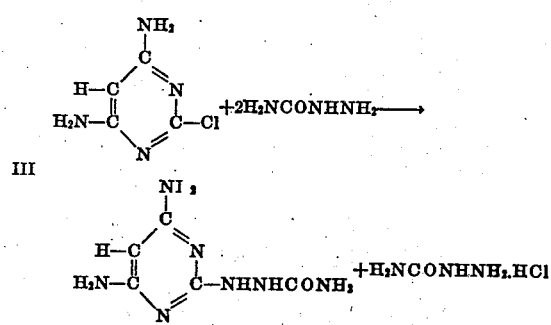

The above reaction may likewise be carried out in the presence of an acid acceptor, such as pyridine, quinoline, dimethyl aniline, calcium carbonate, etc., instead of the molar excess of the semicarbazide.

Example 2

*Preparation of 2,4,6-tri-semicarbazido 1,3-diazine*

The same procedure is followed as described under Example 1 with the exception that the halogenated diazine is 2,4,6-trichloro 1,3-diazine and the semicarbazide is employed in an amount corresponding to 6 mols semicarbazide per mol of the said halogenated diazine. The reaction may be represented by the following equation:

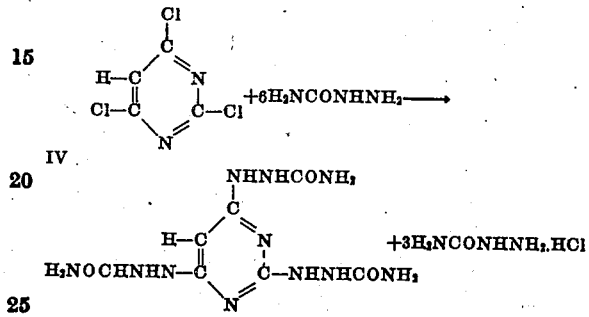

When it is desired to produce only the mono-semicarbazido or the mono-(thiosemicarbazido) diazine derivatives, then still another method may be employed. Specifically the hydrazino derivatives of the 1,3-diazine are caused to react with cyanates, thiocyanates, isocyanates or isothiocyanates to yield the corresponding semicarbazido- or thiosemicarbazido-substituted products. For example, a hydrazino 1,3-diazine is caused to react in aqueous solution under carefully controlled temperature conditions with a cyanate, isocyanate, thiocyanate or isothiocyanate, the reaction proceeding as represented by the following general equation:

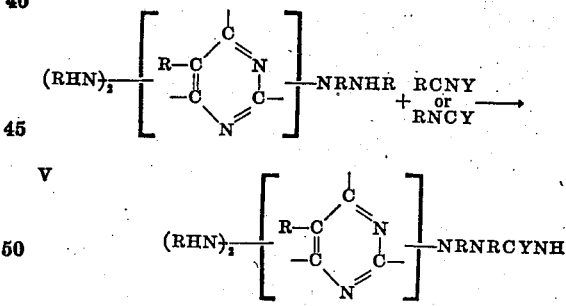

In the above equation R and Y have the same meaning as above given with reference to Formula I for the diazine derivatives of this invention.

When R in the formulas RCNY and RNCY represents hydrogen, the acids corresponding to the formulas HCNY and HNCY may be formed in situ by using an alkali-metal salt, an alkaline-earth salt or an ammonium salt of cyanic, isocyanic, thiocyanic or isothiocyanic acids and by carrying out the reaction either in the presence of an iorganic acid, e. g., hydrochloric, hydrobromic, sulfuric, etc., or by using a preformed inorganic acid salt of the hydrazino diazine as a starting reactant, e. g., a monohydrochloride or monohydrobromide thereof. Sodium, potassium, calcium and mangesium cyanates, isocyanates, thiocyanates and isothiocyanates are more specific examples of salts that may be used as starting reactants. More specific examples of normal and isocyanates that may be employed when R in the formulas RCNY and RNCY is other than hydrogen are the methyl, ethyl, propyl, isopropyl, butyl, amyl, allyl, phenyl, chlorphenyl, etc., cyanates, isocyanates, thiocyanates and isothiocyanates. More specific examples of aminodiazines that may be used in preparing mono-semicarbazido diamino diazines or mono-(thiosemicarbazido) diamino diazines by the above-described method are:

2-hydrazino 4,6-di-(ethylamino) 1,3-diazine
2-ethylhydrazino 4,6-di(phenylamino) 1,3-diazine
2,4,6-tri-(methylhydrazino) 1,3-diazine
2,4,6-tri-(phenylhydrazino) 1,3-diazine
2-amino 4-ethylamino 6-phenylhydrazino 1,3-diazine
2-amino 4-methylamino 6-ethylhydrazino 1,3-diazine
2,4,6-tri-(propylhydrazino) 1,3-diazine
4-hydrazino 5-methyl 2,6-diamino 1,3-diazine
2,4-di-hydrazino 5-phenyl 6-amino 1,3-diazine
2,4,6-tri-hydrazino 5-tolyl 1,3-diazine The following example illustrates the production of 4-semicarbazido 2,6-di-(methylamino) 1,3-diazine by the above-described method. All parts are by weight.

EXAMPLE 3

Fifty-one and one-half (51½) parts 4-hydrazino 2,6-di-(methylamino) 1,3-diazine monohydrochloride were dissolved in 500 parts distilled water, after which the solution was cooled to 0° C. To the cooled solution was added 30 parts potassium cyanate in 100 parts water. The reaction mixture was kept at a low temperature of the order of 0° to 5° C. for several hours. Finally the mass was heated on a water bath for 30 minutes. The reaction product comprising 4-semicarbazido 2,6-di-(methylamino) 1,3-diazine was filtered off, washed free of potassium chloride and dried.

From the foregoing description it will be seen that the present invention provides new and useful semicarbazido and thiosemicarbazido diazines, examples of which are the tri-semicarbazido 1,3-diazines, the tri-(thiosemicarbazido) 1,3-diazines, the monoamino (—NHR) di-semicarbazido 1,3-diazines, the monoamino (—NHR) di-(thiosemicarbazido) 1,3-diazines, the diamino [(—NHR)₂] monosemicarbazido 1,3-diazines and the diamino [(—NHR)₂] mono-(thiosemicarbazido) 1,3-diazines. Other and more specific examples of these new compounds are shown below:

VI
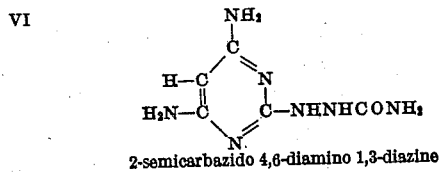
2-semicarbazido 4,6-diamino 1,3-diazine

VII
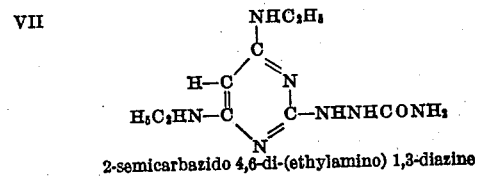
2-semicarbazido 4,6-di-(ethylamino) 1,3-diazine

VIII
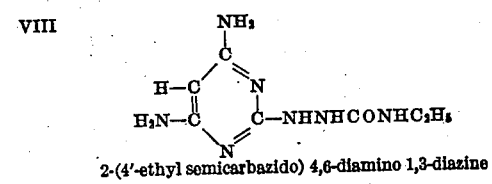
2-(4'-ethyl semicarbazido) 4,6-diamino 1,3-diazine

IX
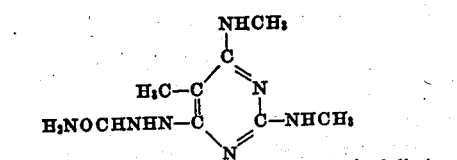
4-semicarbazido 5-methyl 2,6-di-(methylamino) 1,3-diazine

X
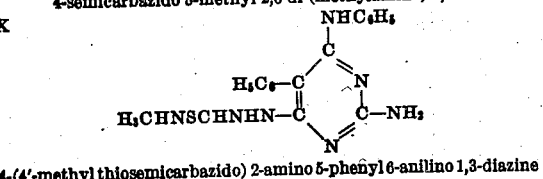
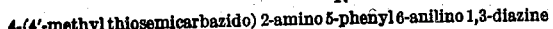
4-(4'-methyl thiosemicarbazido) 2-amino 5-phenyl 6-anilino 1,3-diazine XI
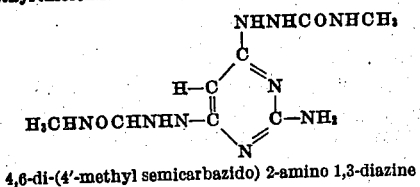
4,6-di-(4'-methyl semicarbazido) 2-amino 1,3-diazine XII
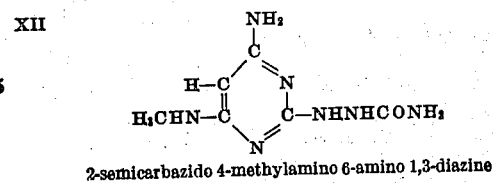
2-semicarbazido 4-methylamino 6-amino 1,3-diazine XIII
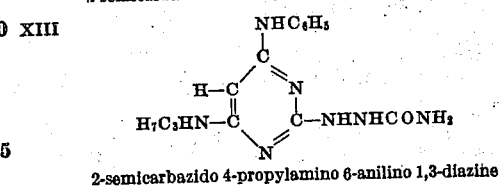
2-semicarbazido 4-propylamino 6-anilino 1,3-diazine XIV
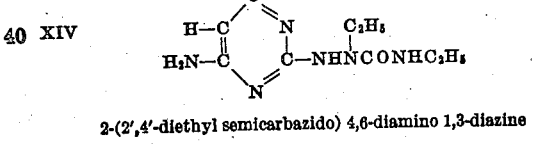
2-(2',4'-diethyl semicarbazido) 4,6-diamino 1,3-diazine XV
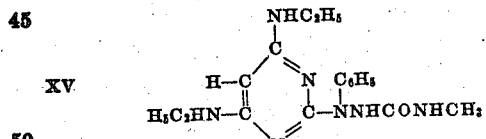
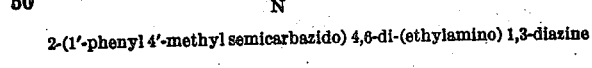
2-(1'-phenyl 4'-methyl semicarbazido) 4,6-di-(ethylamino) 1,3-diazine XVI
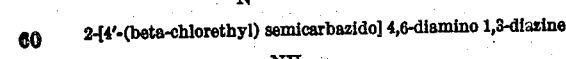
2-[4'-(beta-chlorethyl) semicarbazido] 4,6-diamino 1,3-diazine XVII
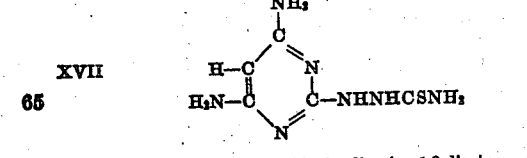
2-thiosemicarbazido 4,6-diamino 1,3-diazine XVIII
2,4-di-semicarbazido 6-amino 1,3-diazine

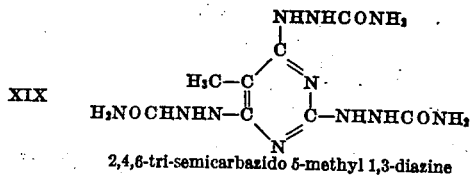

XIX  2,4,6-tri-semicarbazido 5-methyl 1,3-diazine

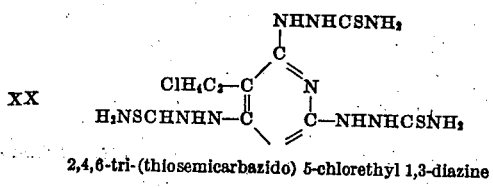

XX  2,4,6-tri-(thiosemicarbazido) 5-chlorethyl 1,3-diazine

Other examples are listed below without their formulas since their formulas will be readily apparent to those skilled in the art from the formulas of the above-mentioned compounds:

2-(2'-ethyl thiosemicarbazido) 4,6-di-anilino 1,3-diazine
2-thiosemicarbazido 4,6-di-(ethylamino) 1,3-diazine
2-(1'-ethyl 4'-phenyl thiosemicarbazido) 4,6-di-amino 1,3-diazine
2-(2',4'-diethyl thiosemicarbazido) 4,6 - diamino 1,3-diazine
2-thiosemicarbazido 4-ethylamino 6-phenylamino 1,3-diazine
2-semicarbazido 4,6-di-(proplyamino) 1,3-diazine
2-semicarbazido 4,6-di-(cyclohexylamino) 1,3-diazine
2-semicarbazido 4,6-di-(chloranilino) 1,3-diazine
2-semicarbazido 4,6-di-(chlorethylamino) 1,3-diazine
2,4-di-(thiosemicarbazido) 6-amino 1,3-diazine
2-semicarbazido 4-thiosemicarbazido 6-amino 1,3-diazine
2-thiosemicarbazido 5-ethyl 4,6-di-(ethylamino) 1,3-diazine
2,4,6-tri-(thiosemicarbazido) 1,3-diazine
2,4-di-(thiosemicarbazido) 5-methyl 6-amino 1,3-diazine
4-semicarbazido 2,6-diamino 1,3-diazine
4-thiosemicarbazido 2,6-diamino 1,3-diazine In a manner similar to that described above with particular reference to the production of semicarbazido and thiosemicarbazido 1,3- or meta-diazines (semicarbazido and thiosemicarbazido pyrimidines), the corresponding semicarbazido and thiosemicarbazido 1,2- or ortho-diazines (semicarbazido and thiosemicarbazido pyridazines) and the semicarbazido and thiosemicarbazido 1,4- or para-diazines (semicarbazido and thiosemicarbazido pyrazines) may be prepared.

What we claim as new and desire to secure by Letters Patent of the United States is:

1. Chemical compounds corresponding to the general formula

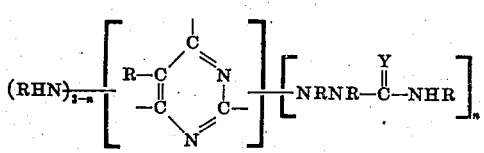

where $n$ is an integer and is at least 1 and not more than 3, R is a member of the class consisting of hydrogen and monovalent hydrocarbon and halo-hydrocarbon radicals, and Y is a member of the class consisting of oxygen and sulfur.

2. Chemical compounds as in claim 1 wherein R represents hydrogen.
3. Chemical compounds as in claim 1 wherein Y represents oxygen.
4. Chemical compounds as in claim 1 wherein R represents hydrogen and Y represents oxygen.
5. Chemical compounds as in claim 1 wherein R represents hydrogen and $n$ is 1.
6. 2,4,6-tri-semicarbazido 1,3-diazine.
7. 4-semicarbazido 2,6-diamino 1,3-diazine.
8. 4-thiosemicarbazido 2,6-diamino 1,3-diazine.
9. The method of preparing chemical compounds corresponding to the general formula

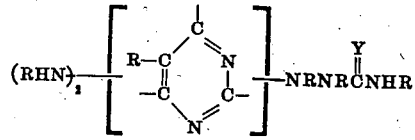

where Y represents a member of the class consisting of oxygen and sulfur and R represents a member of the class consisting of hydrogen and monovalent hydrocarbon and halo-hydrocarbon radicals, said method comprising effecting reaction between (1) a compound corresponding to the general formula

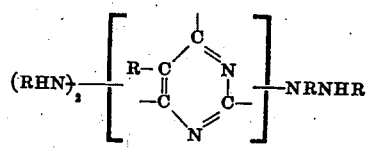

where R has the meaning above given, and (2) a compound selected from the class of compounds corresponding to the general formulas RCNY and RNCY where R and Y have the meanings above given.

10. A method as in claim 9 wherein R represents hydrogen and the reactant of the class consisting of HCNY and HNCY is formed in situ by using a suitable member of the class consisting of the alkali-metal salts, the alkaline-earth salts and the ammonium salts of cyanic, isocyanic, thiocyanic and isothiocyanic acids and by carrying out the reaction in the presence of a mineral acid.

11. A method as in claim 9 wherein R represents hydrogen and the reactant of the class consisting of HCNY and HNCY is formed in situ by using a suitable member of the class consisting of the alkali-metal salts, the alkaline-earth salts and the ammonium salts of cyanic, isocyanic, thiocyanic and isothiocyanic acids and by using an inorganic acid mono salt of the hydrazino diamino diazine as the starting reactant.

12. The method of preparing 4-semicarbazido 2,6-diamino 1,3-diazine which comprises effecting reaction between an inorganic acid mono salt of 4-hydrazino 2,6-diamino 1,3-diazine and an alkali-metal cyanate.

13. The method of preparing 4-thiosemicarbazido 2,6-diamino 1,3-diazine which comprises effecting reaction between an inorganic acid mono salt of 4-hydrazino 2,6-diamino 1,3-diazine and an alkali-metal isothiocyanate.

14. The method of preparing 4-semicarbazido 2,6-diamino 1,3-diazine which comprises effecting reaction between 4-hydrazino 2,6-diamino 1,3-diazine monohydrochloride and potassium cyanate.

GAETANO F. D'ALELIO.
JAMES W. UNDERWOOD.

Certificate of Correction

Patent No. 2,295,564. September 15, 1942.

GAETANO F. D'ALELIO ET AL.

It is hereby certified that errors appear in the printed specification of the above numbered patent requiring correction as follows: Page 2, first column, line 66, for that portion of Formula III reading "$NI_2$" read $NH_2$; page 4, first column, line 13, Formula XX, for

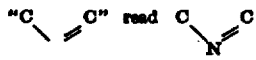

and that the said Letters Patent should be read with these corrections therein that the same may conform to the record of the case in the Patent Office.

Signed and sealed this 17th day of November, A. D. 1942.

[SEAL]

HENRY VAN ARSDALE,
*Acting Commissioner of Patents.*